US 7,536,694 B2

(12) United States Patent
Blinick et al.

(10) Patent No.: US 7,536,694 B2
(45) Date of Patent: May 19, 2009

(54) EXCEPTION HANDLING IN A MULTIPROCESSOR SYSTEM

(75) Inventors: Stephen LaRoux Blinick, Tucson, AZ (US); Ricardo Sedillos Padilla, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 613 days.

(21) Appl. No.: 11/000,705

(22) Filed: Nov. 30, 2004

(65) Prior Publication Data

US 2006/0149952 A1    Jul. 6, 2006

(51) Int. Cl.
G06F 3/00 (2006.01)
G06F 13/24 (2006.01)

(52) U.S. Cl. .................. 719/310; 710/260
(58) Field of Classification Search ................. 719/310; 712/5; 710/260
See application file for complete search history.

(56) References Cited

U.S. PATENT DOCUMENTS

| | | | |
|---|---|---|---|
| 4,268,904 A | 5/1981 | Suzuki et al. | |
| 4,644,465 A | 2/1987 | Imamura | |
| 6,237,058 B1 | 5/2001 | Nakagawa | |
| 7,082,610 B2 * | 7/2006 | Lal | 719/318 |
| 2002/0184292 A1 | 12/2002 | Lal | |
| 2003/0105798 A1 | 6/2003 | Kim et al. | |
| 2003/0120702 A1 | 6/2003 | Jahnke | |
| 2003/0126520 A1 | 7/2003 | Knight | |
| 2006/0117147 A1 | 6/2006 | Blinick | |
| 2006/0117227 A1 | 6/2006 | Hsu | |

OTHER PUBLICATIONS

Description of Relevance of References Cited in Counterpart Chinese Office Action, dated Jul. 31, 2007.
Motorola Inc., "PowerPC Microprocessor Family: The Programming Environments", Motorola Inc. 1997, Revision 1, Cover Page through 8-12, 424 pp.
Motorola Inc., "PowerPC Microprocessor Family: The Programming Environments", Motorola Inc. 1997, Revision 1, 8-13 through Index-16, 404 pp.
Motorola Inc., "PowerPC Microprocessor Family: The Programming Environments: Sections2.3.8-2.3-10: SPRG0-SPRG3", Motorola Inc. 1997, Revision 1, pp. 2-33 to 2-35.
Motorola Inc., "PowerPC Microprocessor Family: The Programming Environments: Chapter 6: Exceptions", Motorola Inc. 1997, Revision 1, pp. 6-1 to 6-42.

* cited by examiner

*Primary Examiner*—Meng-Ai An
*Assistant Examiner*—Lechi Truong
(74) *Attorney, Agent, or Firm*—Willaim K. Konrad; Konrad Raynes & Victor LLP

(57) ABSTRACT

In one embodiment, a first processor of a multiprocessor system, encounters an exception and jumps to exception handler code at an architecture-defined exception vector. The processor is directed to a data structure which provides a programmable exception vector to additional exception handler code. This additional code may be executed as if it were located at the architecture-defined exception vector. Other embodiments are described and claimed.

18 Claims, 2 Drawing Sheets

EXCEPTION HANDLING IN A MULTIPROCESSOR SYSTEM

BACKGROUND

1. Field of the Invention

The present invention relates to managing exceptions in multiprocessor operations.

2. Description of the Related Art

In certain computing environments, multiple host systems may communicate with a control unit, such as an IBM Enterprise Storage Server (ESS)®, for data in a storage device managed by the ESS receiving the request, providing access to storage devices, such as interconnected hard disk drives through one or more logical paths (IBM and ESS are registered trademarks of IBM). The interconnected drives may be configured as a Direct Access Storage Device (DASD), Redundant Array of Independent Disks (RAID), Just a Bunch of Disks (JBOD), etc. The control unit may be a multiprocessor type system. For example, the control unit may include duplicate and redundant processing complexes, also known as clusters, to allow for failover to a surviving cluster in case one fails.

There are various types of multiprocessor systems. In one type, processors may each have their own memory and cache. The processors may run in parallel and share disks. In one type of multiprocessor system, each processor may run a copy of the operating system and the processors may be loosely coupled through a Local Area Network (LAN), for example. Communication between processors may be accomplished through message-passing.

In another type of multiprocessor system, the processors may be more tightly coupled, such as connected through a switch or bridge. Communication between the processors may be accomplished through a shared memory, for example.

In yet another type of multiprocessor system, only one copy of the operating system may run across all of the processors. These types of multiprocessor systems tend to be tightly coupled inside the same chassis with a high-speed bus or a switch. Moreover, the processors may share the same global memory, disks, and Input/Output (I/O) devices.

In the execution of instructions, various conditions, errors or external signals may arise which are often referred to as "exceptions." In many processor architectures such as the PowerPC® processor marketed by IBM Corporation, the processor typically changes to a supervisor state to handle the exception. In addition, information about the state of the processor prior to the occurrence of the exception may be saved to certain processor registers and the processor begins instruction execution at a memory address which is typically predetermined for each type of exception.

The processor may store information about the state of the processor in a "scratch pad" portion of the memory which may be reserved for use by the exception handler. The address of the scratch pad memory may be stored in a "scratch register" to indicate to the exception handler, the location of the scratch pad memory.

The predetermined memory address at which an exception handler is stored is often referred to as an "exception vector." Thus, for example, a "data storage interrupt (DSI)" exception may occur when a data memory access cannot be performed for some reason. A DSI exception may be assigned an exception vector of 0x00300, for example. Accordingly, instruction code to handle a DSI exception is stored in physical memory address 0x00300. Upon occurrence of a DSI exception, the processor begins executing the instruction code at physical memory address 0x00300 to handle the DSI exception.

In many processors, the particular exception vector assigned a particular exception may be set by the processor architecture and thus may not be readily definable by the user. For example, the exception vector may be defined by processor hardware, firmware or some combination of hardware and firmware. Thus, the architecture-defined exception vector is frequently not readily modifiable by the user.

In some processors, the architecture may permit a limited modification of an architecture-defined exception vector. For example, an architecture-defined exception vector may be derived using as an architecture-defined offset vector which defines an offset address. This offset address is added to an architecture-defined physical base address indicated by a processor register which may be set by the user. Thus, for example, a DSI exception may have a hardware-assigned vector offset address of 0x00300. If a particular bit is clear in the appropriate processor register, the physical base address may have a hardware-assigned value 0x00000 such that the processor begins executing the instruction code for the DSI exception at the summed physical address of 0x00300. However, if the particular bit is set in the appropriate processor register, the physical base address may have a hardware-assigned value 0xFFF00000, for example, such that the processor may begin executing the instruction code for the DSI exception at the summed physical address of 0xFFF00300, for example.

Other examples of exceptions include a "machine check" exception in which instruction processing may be suspended, an "instruction storage interrupt" (ISI) exception which occurs upon various failures to fetch the next instruction, an "external interrupt" exception which is signaled to the processor upon assertion of an external interrupt signal, an "alignment" exception which occurs upon various failures to perform a memory access, a "program" exception in which an attempt may be made to execute an improper instruction, and a "system call" exception which occurs upon execution of a system call instruction. Other types of exceptions may arise, depending upon the particular processor and the application of that processor.

Each exception may have an architecture-defined exception vector to the exception handler code for that exception. Thus, in a multiprocessor system, one processor upon encountering an exception, may begin executing the exception handling code at the architecture-defined exception vector for that exception. In executing the exception handling code at the exception vector, the processor may access and configure resources shared by the other processor or processors of the system. These shared resources may include processor busses, memory controllers, bridges, interrupt controllers, memory, etc.

Another processor of the system upon encountering an exception, may be directed by the same exception vector. As a result, a second processor may begin executing the same exception handling code as the first processor and may begin accessing and configuring the same shared resources as the first processor. Such a condition may cause a conflict that could disrupt the operations of the system, particularly if the exception handling operations of the two processors overlap.

In some multiprocessor systems, the various processors of the system may be executing the same operating system which is designed for multiprocessor operation. Hence, the common operating system may be designed to avoid conflicts notwithstanding more than one processor executing the same exception handling code at a particular exception vector.

In other multiprocessor systems, each processor of the system may be executing a different operating system. One approach in such a system is to rewrite portions of the various operating systems to accommodate situations where more than one processor is executing the same exception handling code at a particular exception vector. Another approach is to provide hardware to coordinate the operations of the various processors to reduce conflicts.

SUMMARY

In one embodiment, a first processor of a multiprocessor system, encounters an exception and jumps to exception handler code at an architecture-defined exception vector. The processor is directed to a data structure which provides a programmable exception vector to additional exception handler code. This additional code may be executed as if it were located at the architecture-defined exception vector. Other embodiments are described and claimed.

DETAILED DESCRIPTION

Figure 1:
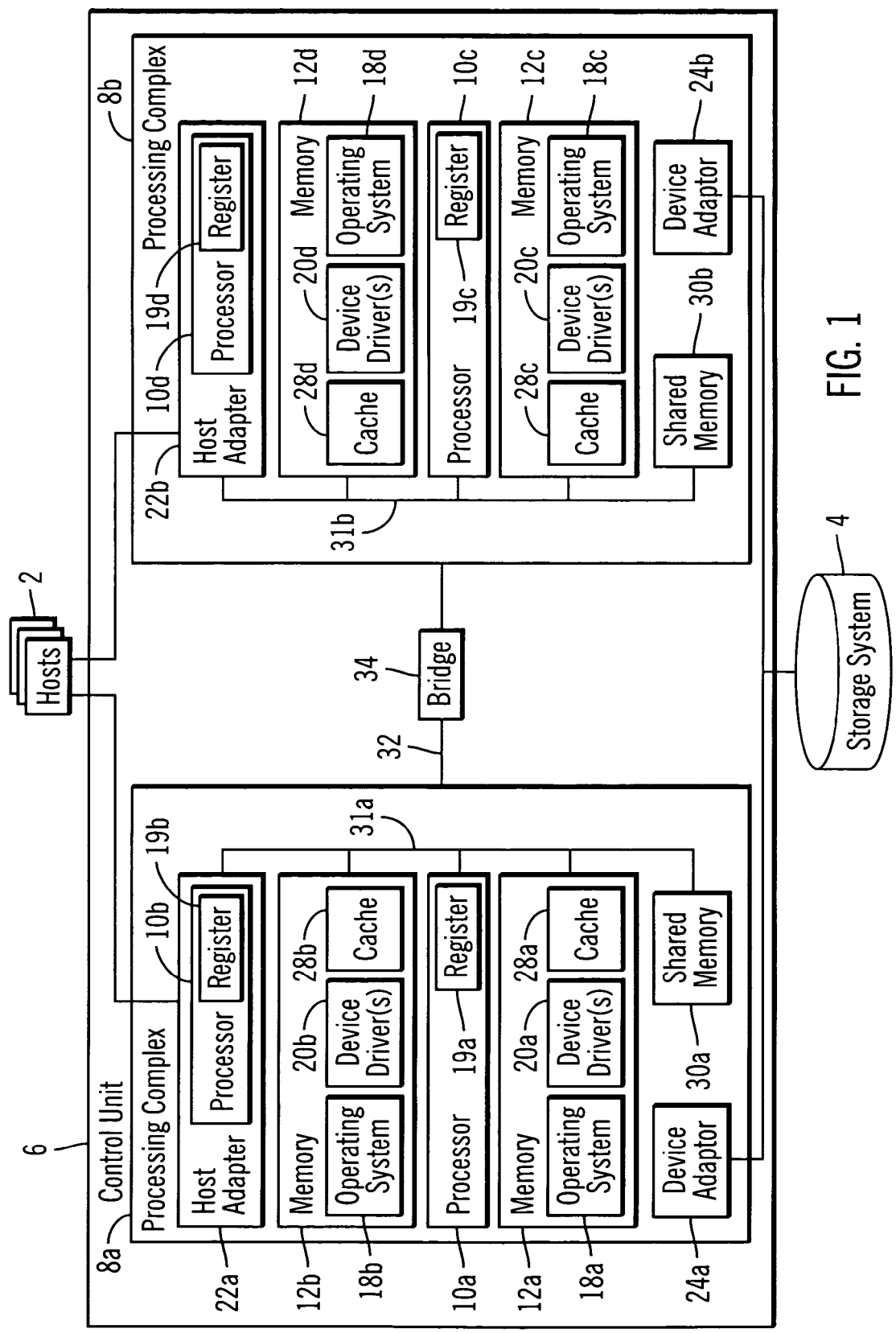
FIG. 1 illustrates a computing environment in which embodiments are implemented.

FIG. 1 illustrates one example of a computing environment in which aspects of the description provided herein may be employed. One or more hosts 2 communicate Input/Output (I/O) requests directed to a storage system 4 to a control unit 6, where the control unit 6 manages access to the storage system 4. In one embodiment, the control unit 6 is comprised of two processing complexes 8a, 8b, each including a processor 10a, 10c and a host adapter 22a, 22b. Each host adapter 22a, 22b enables the associated processing complex 8a, 8b to communicate with the hosts 2, and includes a processor 10b, 10d. Each processor 10a, 10b, 10c, 10d may have the same architecture such as the architecture of a PowerPC® processor, for example. It is appreciated that the processors 10a, 10b, 10c, 10d may have other types of architectures of other models and manufacturers. It is further appreciated that the processors 10a, 10b, 10c, 10d may be different from each other and thus may each have a different architecture or manufacturer.

In the illustrated embodiment, each processor 10a, 10b, 10c, 10d has an associated memory 12a, 12b, 12c, 12d, respectively, and separately executes an operating system 18a, 18b, 18c, 18d, respectively, and device drivers 20a, 20b, 20c, 20d, respectively. The operating systems 18a, 18b, 18c, 18d may be the same type as each other or may each be an entirely different type of operating system. For example, the operating systems 18a, 18c may each be an embedded multithreaded operating system such as LINUX, for example, and the operating systems 18b, 18d may each be an embedded hardware abstraction layer executing real time tasks for a host adapter, for example. It is appreciated that various types and combinations of operating systems may be used, depending upon the particular application.

Each processor 10a, 10b, 10c, 10d may have a number of internal memory resources such as registers as represented by an internal register 19a, 19b, 19c, 19d, respectively. Each device driver 20a, 20b, 20c, 20d provides an interface between the associated operating system 18a, 18b, 18c, 18d in the processing complex 8a, 8b in which the device driver 20a, 20b, 20c, 20d executes, and an internal or external device, such as the host adaptors 22a, 22b and various device adaptors 24a, 24b. Although the illustrated embodiment shows the control unit 6 having two of various components, such as the processing complexes 8a, 8b, device adaptors 24a, 24b etc., it is appreciated that the control unit 6 may have a greater or lesser number of such components.

The processing complex 8a may have a shared memory 30a coupled to a bus 31a, and shared by the processor 10a and the processor 10b of that processing complex 8a. Each memory 12a, 12b may have a cache 28a, 28b, in which one or more lines of a shared memory 30a may be cached. Similarly, the processing complex 8b may have a shared memory 30b coupled to a bus 31b, and shared by the processor 10c and the processor 10d of that processing complex 8b. Each memory 12c, 12d may have a cache 28c, 28d, in which one or more lines of a shared memory 30b may be cached. The caches 28a; 28b, 28c, 28d may cache lines of other memories of the control unit 6.

Each processing complex 8a, 8b may be on separate power boundaries. The processing complexes 8a, 8b may be assigned to handle I/O requests directed to specific volumes configured in the storage system 4. The processing complexes 8a, 8b communicate with the storage system 4, via the device adaptors 24a, 24b, 24c, 24d, over a device network (not shown), which may comprise a local area network (LAN), storage area network (SAN), bus interface, serial interface, etc. Further, the processing complexes 8a, 8b communicate over a connection 32 which includes a bridge 34, enabling processor inter-communication to manage configuring operations performed with respect to the shared devices, such as the shared adaptors 22a, 22b.

The control unit 6 may comprise any type of server, such as an enterprise storage server, storage controller, etc., or other device used to manage I/O requests to attached storage system(s) 4, where the storage systems may comprise one or more storage devices known in the art, such as interconnected hard disk drives (e.g., configured as a DASD, RAID, JBOD, etc.), magnetic tape, electronic memory, etc. The hosts 2 may communicate with the control unit 6, via the adaptors 22a, 22b . . . 22n, over a network (not shown), such as a Local Area Network (LAN), Storage Area Network (SAN), Wide Area Network (WAN), wireless network, etc. Alternatively, the hosts 2 may communicate with the control unit 6 over a bus interface, such as a Peripheral Component Interconnect (PCI) bus or serial interface.

A failure at a shared device, such as a shared adaptor 22a, 22b, could generate machine check conditions to the operating systems 18a, 18b, 18c, 18d in the processing complexes 8a, 8b which could cause both processing complexes to crash if the shared hardware has a type of fatal error. Copending and commonly assigned patent application entitled "METHOD, SYSTEM, AND PROGRAM FOR HANDLING A DEVICE FAILURE", Ser. No. 10/987,572, filed Nov. 12, 2004, which patent application is incorporated herein by reference in its entirety, describes techniques to fence off a failed shared device to avoid the situation where a fatal device error could cause both processing complexes 8a, 8b to crash. In one embodiment, these recovery operations may be coordinated through a shared device such as the bridge 34.

Copending and commonly assigned patent application entitled "MANAGING MULTIPROCESSOR OPERATIONS", Ser. No. 11/001,476, filed Nov. 30, 2004 now U.S. Pat. No. 7,418,557, which patent application is incorporated herein by reference in its entirety, describes coordination of processor activities using a processor cache 28a, 28b, 28c, 28d and a cache coherency protocol. For example, the bridge 34, a shared resource in this embodiment, may malfunction and may be required to be reset to be restored to proper functioning. This recovery operation may be coordinated amongst the processors 10a, 10b, 10c, 10d using one or more processor caches 28a, 28b, 28c, 28d and a cache coherency protocol.

As explained in greater detail below, exception handling code at an exception vector may be provided to direct one processor to a data structure which may be an internal register of that processor for example. The data structure for this processor may provide another exception vector to an address which contains the relevant exception handling code for this processor. This exception handling code at the exception vector provided by the data structure may be executed by the processor in the same manner as if the exception handling code were located at the original exception vector address.

A second processor executing the same exception handling code at the same exception vector may similarly be directed to a data structure such as a register internal to that processor. This data structure for the second processor may likewise include an exception vector to yet another address which may contain a separate exception handling code for the second processor. This exception handling code at the exception vector provided by the second data structure may be executed by the second processor in the same manner as if the exception handling code were located at the original exception vector address. In this manner, separate processors may execute separate exception handlers notwithstanding that each processor is initially directed to the same physical memory address by a common architecture-defined exception vector. As a consequence, conflicts may be reduced or avoided. It is appreciated that in other applications, other features may be utilized, depending upon the particular application.

Figure 2:
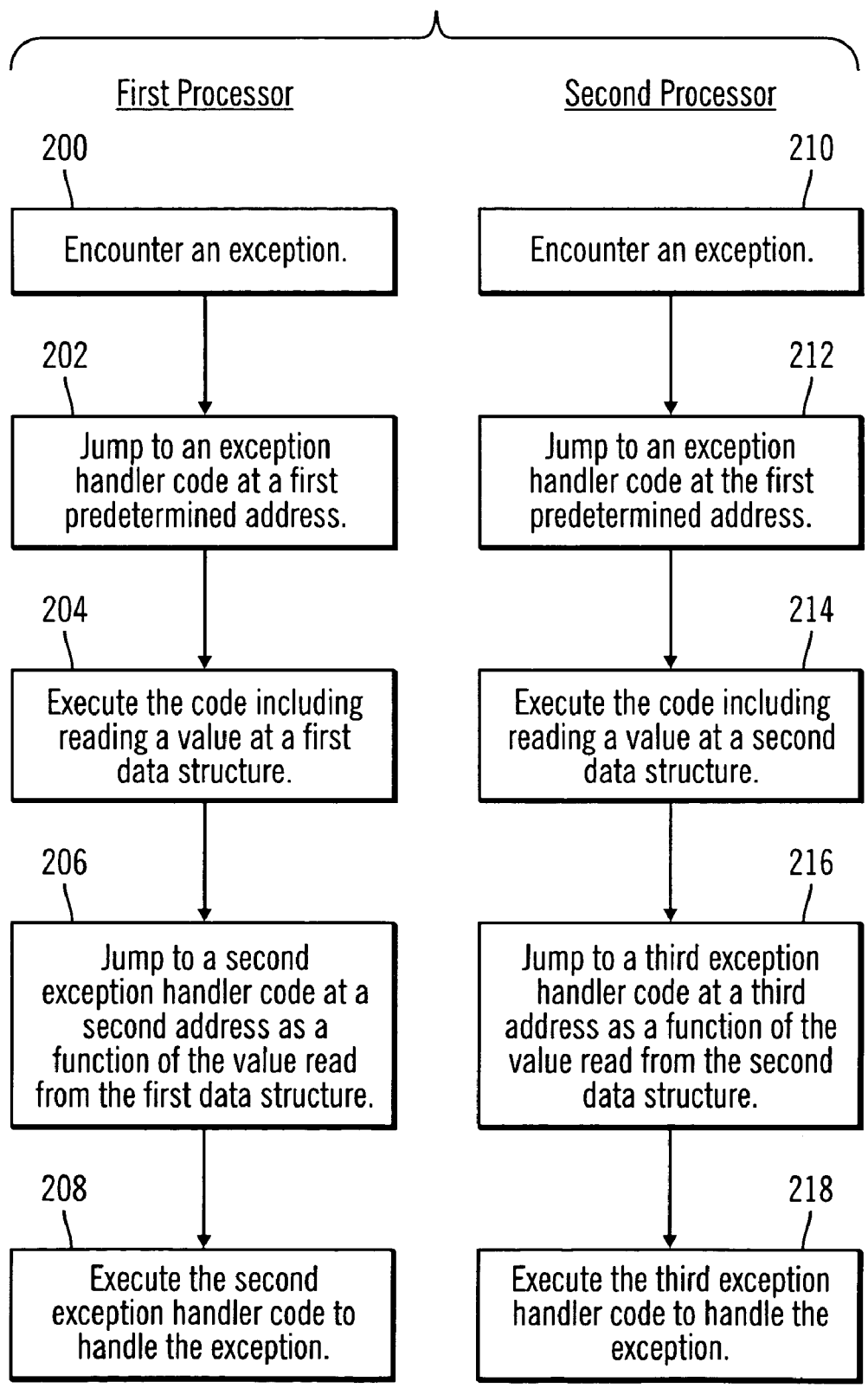
FIG. 2 illustrates operations to manage multiprocessor exception handling operations.

FIG. 2 illustrates an embodiment of operations in which exception handlers may be executed by a plurality of processors in a multiprocessor system such as the control unit 6, for example. In one operation, a first processor, such as the processor 10a, for example, encounters (block 200) an exception while executing instructions. The encountered exception may be any of a number of exceptions such as a DSI, machine check, ISI, external interrupt, alignment, program, or system call exception, for example. It is appreciated that the encountered exception may be another type of exception, depending upon the particular processor and the application of that processor.

In another operation, the first processor 10a jumps (block 202) to an exception handler code at a first predetermined address. In the illustrated embodiment, the encountered exception has an architecture-defined exception vector. For example, the encountered exception may be DSI exception having a hardware-defined exception vector of the physical address 0x00300, for example of the shared memory 30a, for example. Accordingly, the processor 10a jumps to the instruction code stored at physical memory address 0x00300.

In one type of processor, architecture-defined exception vectors may be defined by flash memory or read-only memory. In other processors, exception vectors may be defined by hardware circuitry. It is appreciated that an architecture-defined exception vector may be defined by a variety of techniques including hardware, firmware or other techniques which limit or eliminate the user-programmability of an architecture-defined exception vector.

Another example of an architecture-defined exception vector is one in which the address of an exception vector may be derived using an architecture-defined offset vector which defines an offset address which is added to an architecture-defined physical base address indicated by a processor register which may be set by the user. Thus, for example, a DSI exception may have a hardware-assigned vector offset address of 0x00300. If a particular bit is clear in the appropriate processor register, the physical base address may have a hardware-assigned value 0x00000 such that the processor 10a begins executing the instruction code for the DSI exception at the predetermined physical address of 0x00300. However, if the particular bit is set in the appropriate processor register, the physical base address may have a hardware-assigned value 0xFFF00000, for example, such that the processor 10a may begin executing the instruction code for the DSI exception at the predetermined physical address of 0xFFF00300, for example of the shared memory 30a, for example.

In another operation, the processor 10a executes (block 204) the code stored at the predetermined address, such as the DSI exception vector physical address 0x00300, for example. In this example, the exception handler code stored at the exception vector is code which is capable of being executed by either processor 10a, 10b of the control unit 6. Hence, the exception handler code stored at the architecture-defined exception vector is a common exception handler code for both processors 10a, 10b. In executing the common exception handler code at the physical address 0x00300, the first processor 10a reads a value at a first data structure. The processor 10a may jump (block 206) to another address, the identity of which is a function of the value read from the data structure.

In the illustrated embodiment, the data structure may be an internal register 19a of the processor 10a. For example, in the PowerPC® processor, the special purpose register (SPRG0) may be read by the processor 10a when executing the code stored at the original exception vector physical address. Thus, the exception handler code at the architecture-defined exception vector may direct the processor 10a to read the value stored in its SPRG0 register 19a. It is appreciated that other resources to which the processor 10a has access may be utilized to store this value.

In this example, the value read by the processor 10a from its SPRG0 register 19a is a programmable exception vector which identifies a physical memory address at which additional exception handler code may be stored for handling the encountered exception, such as the DSI exception, for example. The physical memory address of the programmable exception vector may be in the memory 12a, for example, which may be a private memory for the processor 10a, for example. Upon jumping to the physical memory address identified by the programmable exception vector stored in the processor register 19a, the additional exception handler code stored at that programmable exception vector may be executed (block 208).

In the illustrated embodiment, the exception vector stored in the SPRG0 register of the processor 10a is readily programmable such that software may store an appropriate address into the register. It is appreciated that the particular address stored in the register may be selected by the operating system 18a, an application program, firmware, hardware or other sources, depending upon the particular application.

In addition, the actual exception vector may be stored in its entirety in the processor register 10a. It is appreciated that the exception vector may be determined using other functions of the stored value. For example, the stored value may be an offset vector which is added to a base address to provide the final exception vector. Other manipulations may be done to the value stored in the processor register 19a to provide the exception vector.

The additional exception handling code at the programmable exception vector stored by the processor register 19a may be executed by the processor 10a in the same manner as in effect a first level exception handling code as if the additional exception handling code were located at the physical address of the architecture-defined exception vector. Moreover, because the additional exception handler code is located at a separate physical address defined by a register 19a of the processor 10a, the additional exception handler code may be executed separately by the processor 10a and thus may not be common exception handler code for both processors 10a, 10b. This additional exception handler code may be separate and specific to the operating system 18a of the first processor 10a. In this manner, conflicts may be reduced or eliminated in the execution of exception handler code by multiple processors.

In the illustrated example, a second processor such as the processor 10b of the host adapter 22a, also encounters (block 210) an exception. This may occur at the same time that the first processor 10a encounters (block 200) an exception, or may occur sufficiently close in time that exception handler operations by both processors 10a, 10b might lead to a conflict. In this example, the encountered exception is, again, a DSI exception but may be any of a number of exceptions such as machine check, ISI, external interrupt, alignment, program, or system call exception, for example.

In another operation, the second processor 10b jumps (block 212) to an exception handler code at the same predetermined address to which the first processor 10a jumped (block 202). In the illustrated embodiment, the exception encountered by the second processor 10b again has an architecture-defined exception vector. For example, the encountered exception may again be DSI exception having a hardware-defined exception vector of the physical address 0x00300, for example, of the same shared memory 30a, for example. Accordingly, the processor 10b jumps to the instruction code stored at physical memory address 0x00300, the same as the processor 10a in this example.

In another operation, the processor 10b executes (block 214) the code stored at the predetermined address such as the DSI exception vector physical address 0x00300 in this example. As previously mentioned, in this example, the exception handler code stored at the exception vector is common code which may be executed by either processor 10a, 10b of the control unit 6. In executing the common exception handler code at the physical address 0x00300, the second processor 10b reads a value at a second data structure. The processor 10b may jump (block 216) to another address, the identity of which is a function of the value read from the second data structure.

In the illustrated embodiment, the second data structure may be an internal register 19b of the processor 10b such as the special purpose register (SPRG0) of the processor 10b. Thus, the common exception handler code stored at the common architecture-defined exception vector may direct each processor 10a, 10b executing that code to commonly identified defined data structures, such as SPRG0, for example. However, each processor 10a, 10b in executing that code, is actually directed to a different internal register 19a, 19b but having a common identification, SPRG0. Accordingly, the SPRG0 register 19b may be read by the processor 10b when executing the code stored at the original architecture-defined exception vector physical address. It is appreciated that other resources to which the processor 10b has access may be utilized to store this value.

In this example, the value read by the processor 10b is again, a programmable exception vector which identifies a physical memory address at which additional exception handler code may be stored for handling the encountered exception, such as the DSI exception, for example. The physical memory address of the programmable exception vector may be a physical address of the memory 12b, for example, which may be a private memory for the processor 10b, for example. Thus, the programmable exception vector stored by the SPRG0 register 19b of the processor 10b may be different from the programmable exception vector stored by the SPRG0 register 19a of the processor 10a. Hence, the additional exception handler code stored at the programmable exception vector of the register 19b of the processor 10b, may be separate from the additional exception handler code stored at the programmable exception vector of the register 19a of the processor 10a. For example, the additional exception handler code stored in memory 12b at the programmable exception vector of the register 19b of the processor 10b, may be separate from the additional exception handler code stored in the memory 12a at the programmable exception vector of the register 19a of the processor 10a. In addition, this separate exception handler code may be specific to the operating system 18b of the second processor 10b.

Upon jumping to the physical memory address identified by the programmable exception vector stored in the register 19b of the processor 10b, the separate, additional exception handler code stored at that programmable exception vector may be executed (block 218) by the second processor 10b. This additional exception handling code at the programmable exception vector identified by the register 19b of the processor 10b (and stored in the memory 12b) may be executed by the processor 10b in the same manner as if the additional exception handling code were located at the physical address of the architecture-defined exception vector, which is within the shared memory 30a, in this example. Moreover, because the additional exception handler code is located at a physical address defined by a register 19b of the processor 10b, the additional exception handler code may be executed separately by the processor 10b and thus may not be common exception handler code for both processors 10a, 10b. In this manner, conflicts may be reduced or eliminated in the execution of exception handler code by multiple processors.

The processors 10c, 10d of the complex 8b may utilize a shared memory 30b and internal registers 19c, 19d in a similar manner to coordinate exception handling and to reduce or eliminate conflicts. It is appreciated that various combinations of processors 10a, 10b, 10c, 10d may utilize a shared memory and various data structures for exception handling.

Additional Embodiment Details

The described embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and nonvolatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present description, and that the article of manufacture may comprise any information bearing medium known in the art.

Certain embodiments may be directed to a method for deploying computing instruction by a person or automated processing integrating computer-readable code into a computing system, wherein the code in combination with the computing system is enabled to perform the operations of the described embodiments.

In the described embodiments, the control unit 6 included two processing complexes 8a, 8b. In additional embodiments, there may be more than two systems accessing a shared device.

The illustrated operations of FIG. 2 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments has been presented for the purposes of illustration and explanation. It is not intended to be exhaustive or to limit to the precise form disclosed. Many modifications and variations are possible in light of the above teaching.

What is claimed is:

1. A method of code execution in a system having first and second processors, comprising:
    storing a first programmable address in a first data structure;
    said first processor encountering a first exception;
    said first processor jumping to execute a first exception handler code at a first predetermined address;
    said first processor executing said first exception handler code at said first predetermined address, wherein said first instruction handler code directs said first processor to read said first programmable address at said first data structure;
    said first processor jumping to execute a second exception handler code at a second address as a function of said first programmable address read from said first data structure;
    said first processor executing said second exception handler code to handle said first exception;
    storing a second programmable address in a second data structure;
    said second processor encountering a second exception;
    said second processor jumping to execute said first exception handler code at said first predetermined address;
    said second processor executing said first exception handler code at said first predetermined address, wherein said first instruction handler code directs said second processor to read said second programmable address at said second data structure;
    said second processor jumping to execute a third exception handler code at a third address as a function of said second programmable address read from said second data structure;
    said second processor executing said third exception handler code to handle said second exception; and
    adding said first programmable address read from said first data structure as an offset to a base address to calculate said second address, and adding said second programmable address read from said second data structure as an offset to a base address to calculate said third address.

2. The method of claim 1 wherein said first data structure is a register internal to said first processor.

3. The method of claim 2 wherein said second data structure is a register internal to said second processor.

4. The method of claim 3 wherein said internal register of said first processor and said internal register of said second processor have a common identification within said first exception handler code.

5. The method of claim 1 wherein said first predetermined address is an exception vector defined by the architectures of said first and second processors.

6. The method of claim 5 wherein said architecture-defined exception vector is defined by flash memory of first and second processors.

7. The method of claim 5 wherein said architecture defined exception vector includes an architecture defined offset vector.

8. The method of claim 1 wherein said second address is said first programmable address read from said first data structure, and said third address is said second programmable address read from said second data structure.

9. The method of claim 1 wherein said second address addresses a private memory of said first processor and said third address addresses a private memory of said second processor.

10. A method for deploying computing instructions, comprising:
    integrating computer-readable code into a system, wherein the system has a first processor having a first data structure adapted to store a value, a second processor having a second data structure adapted to store a value, and a memory adapted to store a first exception handler code at a first predetermined address, a second exception handler code at a second address and a third exception handler code at a third address, and wherein the code in combination with the system is enabled to cause the system to perform:
    storing a first programmable address in said first data structure;
    said first processor encountering a first exception;
    said first processor jumping to execute said first exception handler code at said first predetermined address;
    said first processor executing said first exception handler code at said first predetermined address, wherein said first instruction handler code directs said first processor to read said first programmable address at said first data structure;
    said first processor jumping to execute said second exception handler code at said second address as a function of said first programmable address read from said first data structure; and
    said first processor executing said second exception handler code to handle said first exception;
    storing a second programmable address in said second data structure;
    said second processor encountering a second exception;
    said second processor jumping to execute said first exception handler code at said first predetermined address;

said second processor executing said first exception handler code at said first predetermined address, wherein said first instruction handler code directs said second processor to read said second programmable address at said second data structure;

said second processor jumping to execute said third exception handler code at said third address as a function of said second programmable address read from said second data structure;

said second processor executing said third exception handler code to handle said second exception;

adding said first programmable address read from said first data structure as an offset to a base address to calculate said second address; and adding said second programmable address read from said second data structure as an offset to a base address to calculate said third address.

11. The method of claim 10 wherein said first data structure is a register internal to said first processor.

12. The method of claim 11 wherein said second data structure is a register internal to said second processor.

13. The method of claim 12 wherein said internal register of said first processor and said internal register of said second processor have a common identification within said first exception handler code.

14. The method of claim 10 wherein said first and second processor each define an architecture and wherein said first predetermined address is an exception vector defined by the architectures of said first and second processors.

15. The method of claim 14 wherein said first and second processors each have a flash memory and wherein said architecture-defined exception vector is defined by said flash memories of said first and second processors.

16. The method of claim 14 wherein said architecture defined exception vector includes an architecture defined offset vector.

17. The method of claim 10 wherein said second address is said first programmable address read from said first data structure, and said third address is said second programmable address read from said second data structure.

18. The method of claim 10 wherein said second address addresses a private memory of said first processor and said third address addresses a private memory of said second processor.

* * * * *